US009785466B2

United States Patent
Chin et al.

(10) Patent No.: US 9,785,466 B2
(45) Date of Patent: Oct. 10, 2017

(54) MANAGING DATA SEGMENTS IN MEMORY FOR CONTEXT SWITCHING WITH STANDALONE FETCH AND MERGE SERVICES

(71) Applicant: International Business Machines Corporation, Armonk, NY (US)

(72) Inventors: Alicia Elena Chin, Markham (CA); Yonggang Hu, Richmond Hill (CA); Zhenhua Hu, Toronto (CA); Shicong Meng, Elmsford, NY (US); Xiaoqiao Meng, Yorktown Heights, NY (US); Jian Tan, Wappingers, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/175,529

(22) Filed: Feb. 7, 2014

(65) Prior Publication Data
US 2015/0227399 A1 Aug. 13, 2015

(51) Int. Cl.
*G06F 9/48* (2006.01)
*G06F 12/00* (2006.01)

(52) U.S. Cl.
CPC ............ *G06F 9/4881* (2013.01); *G06F 12/00* (2013.01); *G06F 2209/484* (2013.01)

(58) Field of Classification Search
CPC ... G06F 9/4881; G06F 12/00; G06F 2209/484
See application file for complete search history.

(56) References Cited

U.S. PATENT DOCUMENTS

| | | | | |
|---|---|---|---|---|
| 2010/0281166 | A1* | 11/2010 | Buyya | G06F 9/5072 709/226 |
| 2012/0311581 | A1* | 12/2012 | Balmin et al. | 718/100 |
| 2013/0198756 | A1* | 8/2013 | Grube | G06F 11/2094 718/104 |
| 2013/0290976 | A1* | 10/2013 | Cherkasova et al. | 718/104 |
| 2014/0136779 | A1* | 5/2014 | Guha | G06F 9/5066 711/114 |

OTHER PUBLICATIONS

Ahmad, Faraz et al., "Tarazu: Optimizing MapReduce on Heterogeneous Clusters," Architectural Support for Programming Languages and Operating Systems (ASPLOS '12), Mar. 3-7, 2012, London, England, UK, pp. 61-74, ACM Digital Library.

(Continued)

*Primary Examiner* — Li B Zhen
*Assistant Examiner* — Amir Soltanzadeh
(74) *Attorney, Agent, or Firm* — Ference & Associates LLC

(57) ABSTRACT

Methods and arrangements for managing data segments. At least one job is received, each job comprising a dependee set of tasks and a depender set of at least one task, and the at least one of the dependee set of tasks is executed. There is extracted, from the at least one of the dependee set of tasks, at least one service common to at least another of the dependee set of tasks. Other variants and embodiments are broadly contemplated herein.

17 Claims, 10 Drawing Sheets

(56) References Cited

OTHER PUBLICATIONS

Ananthanarayanan, Ganesh et al., "PACMan: Coordinated Memory Caching for Parallel Jobs," Proceedings of the 9th USENIX Symposium on Networked Systems Design and Implementation (NSDI '12), Apr. 25-27, 2012, San Jose, California, USA, pp. 267-280, ACM Digital Library.
Ananthanarayanan, Ganesh et al., "Reining in the Outliers in Map-Reduce Clusters using Mantri," Technical Report, MSR-TR-2010-69, Microsoft Research, Microsoft Corporation, Redmond, WA, USA, Jun. 2010, 24 pages, Microsoft Corporation.
Ananthanarayanan, Ganesh et al., "True Elasticity in Multi-Tenant Data-Intensive Compute Clusters," SOCC'12, Oct. 14-17, 2012, San Jose, California, USA, 7 pages, ACM Digital Library.
Herodotou, Herodotos et al., "Starfish: A Self-tuning System for Big Data Analytics," 5th Biennial Conference on Innovative Data Systems Research (CIDR'1), Jan. 9-12, 2011, Asilomar, California, USA, pp. 261-272, IEEE Digital Library.
Isard, Michael et al., "Dryad: Distributed Data-Parallel Programs from Sequential Building Blocks," EuroSys'07, Mar. 21-23, 2007, Lisboa, Portugal, 14 pages, ACM Digital Library.
Isard, Michael et al., "Quincy: Fair Scheduling for Distributed Computing Clusters," Proceedings of the ACM SIGOPS 22nd symposium on Operating systems principles (SOSP '09), Oct. 11-14, 2009, Big Sky, Montana, USA, 16 Pages, ACM Digital Library.
Kwon, Yongchul et al., "SkewTune: Mitigating Skew in MapReduce Applications," Association for Computing Machinery's Special Interest Group on Management of Data (SIGMOD'12), May 20-24, 2012, Scottsdale, Arizona, USA, 12 pages, ACM Digital Library.
Vavilapalli, Vinod Kumar et al., "Apache Hadoop YARN: Yet Another Resource Negotiator," SOCC'13, Oct. 1-3, 2013, Santa Clara, California, USA, 16 pages, ACM Digital Library.
Wang, Yandong et al., "Hadoop Acceleration Through Network Levitated Merge," International Conference for High Performance Computing, Networking, Storage and Analysis (SC11), Nov. 12-18, 2011, Seattle, Washington, USA, 10 pages, ACM Digital Library.
Wang, Yandong et al., "Preemptive ReduceTask Scheduling for Fair and Fast Job Completion," 10th International Conference on Autonomic Computing (ICAC'13), Jun. 26-28, 2013, San Jose, California, USA, pp. 279-289, USENIX Association.
Zaharia, Matei et al., "Delay Scheduling: A Simple Technique for Achieving Locality and Fairness in Cluster Scheduling," EuroSys'10, Apr. 13-16, 2010, Paris, France, 14 pages, ACM Digital Library.
Zaharia, Matei et al., "Improving MapReduce Performance in Heterogeneous Environments," 8th USENIX Symposium on Operating Systems Design and Implementation (OSDI'08), Dec. 8-10, 2008, San Diego, California, USA, pp. 29-42, ACM Digital Library.
Cheng, Lu et al., "Mitigating the Negative Impact of Preemption on Heterogeneous MapReduce Workloads," 2011 7th International Conference on Network and Service Management (CNSM), Oct. 24-28, 2011, Paris, France, 12 pages, IEEE Digital Library.

\* cited by examiner

```
1: Initialization:
2: Set a starting value to N; (N=number of MapTasks to
   backfill for Q; Index i indicates the task position in Q;
   |Q| = the number of tasks in Q)
3: Method:
4: if (i == the beginning of Q) ∧ (|Q| >= 2) then
5:    Q = sort ReduceTasks in Q according to the number
      of fetched segments in ascending order
6:    Launch the first ReduceTask in Q
7:    i = the next task of Q in round-robin
8: else if (i == the end of Q) ∨ (|Q| == 1) then
9:    Launch the last ReduceTask in Q
10:   if Having pending ReduceTasks then
11:      Insert a new ReduceTask to the end of Q
12:   end if
13:   if No ReduceTask in this round fills up the memory
      then
14:      N ← N + 1
15:   end if
16:   Backfill up to N number of MapTasks
17:   i ← 1
18: else
19:    Launch ReduceTask i in Q
20:    i = the next task of Q in round-robin
21: end if
```

FIG. 5

Input:
1. $mem\_limit$ = memory limit to trigger merge
2. $L$ = the list of ReduceTasks in a progressive queue

Output:
3. $task$ = a ReduceTask to merge its memory segments

Method:
4. $task_{inactive}$ = the inactive ReduceTask in $L$ that uses the largest amount of memory
5. $task_{active}$ = the active ReduceTask in $L$
6. $threshold = mem\_limit \times 0.5 / L.size()$
7. if used memory of $task_{inactive} > threshold$ then
8.    return $task_{inactive}$
9. else
10.    return $task_{active}$
11. end if

FIG. 7

MANAGING DATA SEGMENTS IN MEMORY FOR CONTEXT SWITCHING WITH STANDALONE FETCH AND MERGE SERVICES

BACKGROUND

An effective framework involves distributed parallel computing, which operates to disperse processing tasks across multiple processors operating on one or more computing devices such that parallel processing may be executed simultaneously. Important implementations of large scale distributed parallel computing systems are MapReduce by Google®, Dryad by Microsoft®, and the open source Hadoop® MapReduce implementation. Google® is a registered trademark of Google Inc. Microsoft® is a registered trademark of the Microsoft Corporation in the United States, other countries, or both. Hadoop® is a registered trademark of the Apache Software Foundation.

Generally, MapReduce has emerged as a dominant paradigm for processing large datasets in parallel on compute clusters. As an open source implementation, Hadoop has become popular in a short time for its success in a variety of applications, such as social network mining, log processing, video and image analysis, search indexing, recommendation systems, etc. In many scenarios, long batch jobs and short interactive queries are submitted to the same MapReduce cluster, sharing limited common computing resources with different performance goals. These conditions, among others, present challenges that have been elusive to resolve conventionally.

BRIEF SUMMARY

In summary, one aspect of the invention provides a method comprising: utilizing at least one processor to execute computer code configured to perform the steps of: receiving at least one job, each job comprising a dependee set of tasks and a depender set of at least one task; executing at least one of the dependee set of tasks; and extracting from the at least one of the dependee set of tasks at least one service common to at least another of the dependee set of tasks.

Another aspect of the invention provides an apparatus comprising: at least one processor; and a computer readable storage medium having computer readable program code embodied therewith and executable by the at least one processor, the computer readable program code comprising: computer readable program code configured to receive at least one job, each job comprising a dependee set of tasks and a depender set of at least one task; computer readable program code configured execute at least one of the dependee set of tasks; and computer readable program code configured extract from the at least one of the dependee set of tasks at least one service common to at least another of the dependee set of tasks.

An additional aspect of the invention provides a computer program product comprising: a computer readable storage medium having computer readable program code embodied therewith, the computer readable program code comprising: computer readable program code configured to receive at least one job, each job comprising a dependee set of tasks and a depender set of at least one task; computer readable program code configured execute at least one of the dependee set of tasks; and computer readable program code configured extract from the at least one of the dependee set of tasks at least one service common to at least another of the dependee set of tasks.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 5 sets forth a flow control algorithm for a progressive queue.

FIG. 7 sets forth an algorithm for selecting a task for memory-to-disk merge.

DETAILED DESCRIPTION

Figure 1:
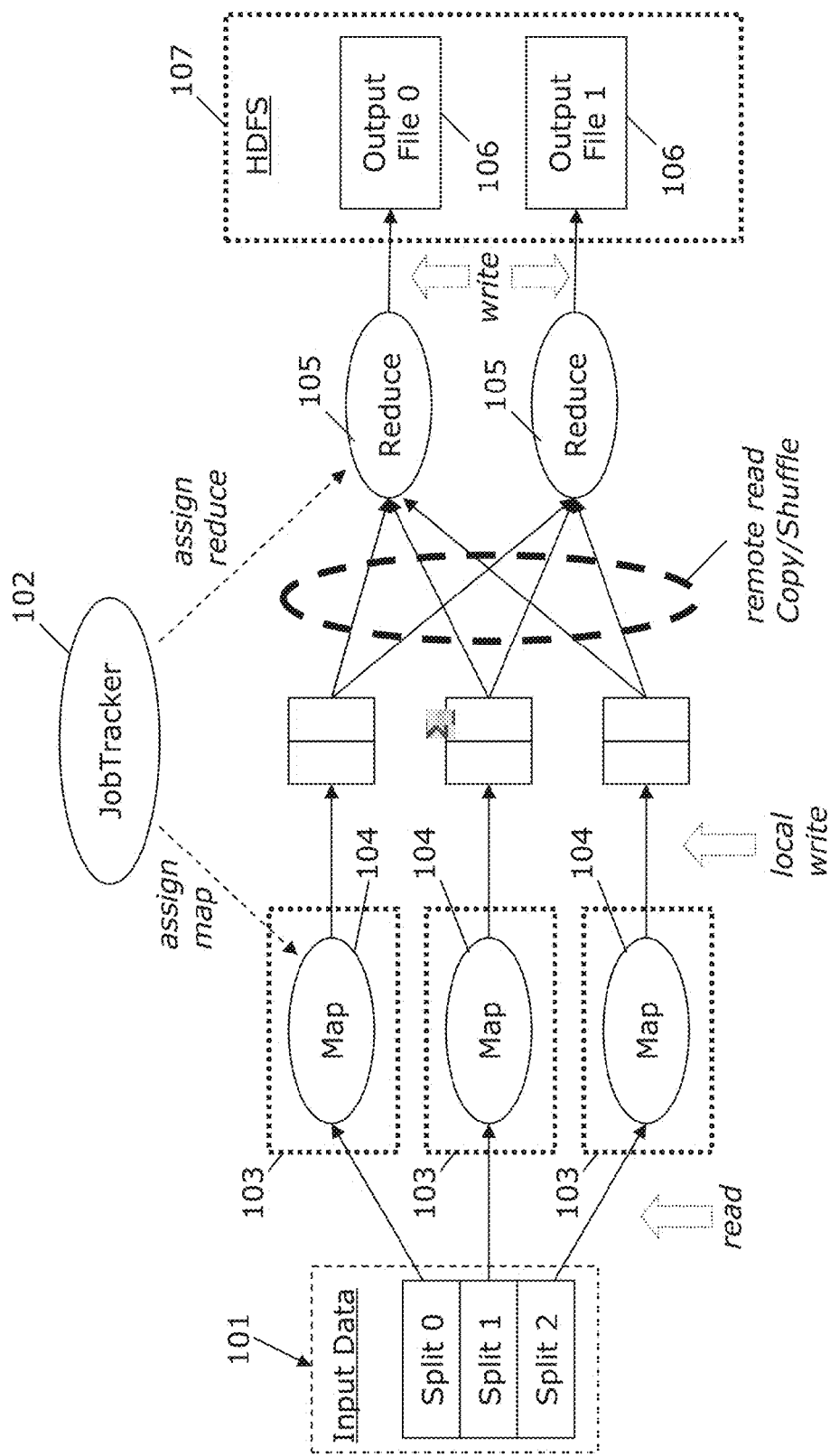
FIG. 1 sets forth a general example of executing a single job in the Hadoop MapReduce implementation.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made herebelow to FIGS. 1-7. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 9. In accordance with an example embodiment, most if not all of the process steps, components and outputs discussed with respect to FIGS. 1-7 can be performed or utilized by way of a processing unit or units and system memory such as those indicated, respectively, at 16' and 28' in FIG. 9, whether on a server computer, a client computer, a node computer in a distributed network, or any combination thereof.

Broadly contemplated herein, in accordance with at least one embodiment of the invention, are dynamic MapReduce arrangements that holistically resolve several conventional performance problems. These problems include:

difficulty in selecting optimal performance parameters for a single job in a fixed, dedicated environment, and lack of any capability to configure parameters that can perform optimally in a dynamic, multi job cluster;

long job execution resulting from a task long-tail effect, often caused by ReduceTask data skew or heterogeneous computing nodes; and inefficient use of hardware resources, since ReduceTasks bundle several functional phases together and may idle during certain phases of execution.

A dynamic arrangement, as broadly contemplated herein in accordance with at least one embodiment of the invention, adaptively interleaves execution of several partially-completed ReduceTasks and backfills MapTasks so that they run in the same JVM (Java virtual machine), one at a time. (A Java virtual machine is a process virtual machine that can execute Java bytecode. Java® is a registered trademark of Oracle Corporation of Redwood City, Calif.) It includes three components to optimize performance and hardware resource usage. As broadly contemplated herein, these components each may be implemented individually or could advantageously be implemented in any combination.

As such, one component, in accordance with at least one embodiment of the invention, involves a running ReduceTask using a detection algorithm to identify resource underutilization during the shuffle phase. It then efficiently yields allocated hardware resources to the next task.

Another component, in accordance with at least one embodiment of the invention, involves a number of ReduceTasks being assembled in a progressive queue, according to a flow control algorithm in the scheduler's runtime. These tasks then execute in an interleaved rotation, one after the other. Essentially any type of rotation is conceivable here, e.g., a viable order determined by the flow control algorithm; alternatively, in particular instances a round-robin rotation may be utilized. Additional ReduceTasks can be inserted adaptively to the progressive queue if full fetching capacity is not reached. MapTasks can be backfilled within the stream of ReduceTask runs if the fetching capacity is still underused.

A third component, in accordance with at least one embodiment of the invention, involves merge threads of each ReduceTask being extracted out as standalone services within the associated JVM and a segment manager. This permits data segments of multiple partially-complete ReduceTasks to reside in the same JVM heap, controlled by a segment manager and served by the common merge threads.

In accordance with a general context relating to at least one embodiment of the invention, FIG. 1 provides an example of executing a single job in the Hadoop MapReduce implementation. A client first submits a job comprised of input data 101 that indicates code and input files. The input 101 may be in the form of a set of key/value pairs, such as the following two functions: map(k,v)→list(k1,v1) and reduce(k1,list(v1))→v2, where (k1,v1) is an intermediate key/value pair. The JobTracker 102 service breaks the input file into chunks and assigns tasks to TaskTracker nodes 103. Map tasks (i.e., map( )) 104 are executed, generating intermediate results in the form of key-value pairs for each block of input 101. After the map tasks 104 are complete, TaskTrackers 103 exchange map-output to build reduce( ) keyspace (not shown). In general, the reduce tasks 105 fetch the intermediate results according to keys and conduct reduce functions after receiving all of the intermediate results. The JobTracker 102 breaks the reduce( ) keyspace into chunks and assigns reduce tasks 105. The reduce task output 106 may be in the set of (k1,v2) pairs and may be stored within the distributed computing framework, for example, in a Hadoop Distributed File System (HDFS) 107.

Conventionally, in MapReduce implementations, performance tends to be sensitive to configuration parameters which include: slowstart, the number of ReduceTasks, and the map/reduce slot ratio. These parameters, described more fully herebelow, are difficult to tune for a single job in a fixed, dedicated environment, never mind for a dynamic, multi job cluster. This sensitivity problem is rooted in the general design of MapReduce architecture, essentially in that MapTasks and ReduceTasks characteristically cannot switch contexts proactively and efficiently. When occupied resources are underutilized, there is no mechanism to automatically detect that this has happened with respect to the running task and efficiently pass control to a next suitable task. As one consequence among others, the ReduceTasks can periodically become idle whenever the MapTasks do not generate enough map outputs in time. As such, an efficient detect-and-yield mechanism can encourage underused tasks to yield occupied resources easily to other tasks.

Generally, in accordance with at least one embodiment of the invention, it is recognized that a statically partitioned key space of ReduceTasks can cause skewed data, especially as some ReduceTasks normally will need to process more intermediate data than others. Even partitioned uniformly, when contentions occur at resource bottlenecks, or when the computing nodes are heterogeneous (e.g., with different memory sizes, network bandwidths and disk speeds), resource under- or over-utilization across computing nodes can still occur. This problem is significantly pronounced when multiple jobs with disparate characteristics run in the same cluster; some of the nodes may run CPU (central processing unit) intensive jobs and other nodes may run I/O (input/output) intensive ones. In this scenario, it is possible that while some ReduceTasks present idle fetch threads, others may be busy trailing tasks that will take a much longer time to finish. A fundamental problem here, then, is that MapReduce lacks a flexible flow control mechanism tailored to its runtime.

In accordance with at least one embodiment of the invention, it is also recognized herein that ReduceTasks normally bundle together fetch threads, merge threads (whether memory-to-disk or disk-to-disk) and the reduce function.

These functions each present distinct resource usage patterns but normally work jointly to serve the same, single ReduceTask. While fetch threads are responsible for collecting intermediate data segments from map outputs, merge threads merge memory segments to disk files, and combine several disk files to a single sorted one file. This bundled design simplifies memory management, since the JVM heap only contains the segments of a single ReduceTask. However, it also causes inefficient use of hardware resources. Even when the system has sufficient memory and available fetch threads to get more data, a ReduceTask may be blocked while waiting for the progression of more MapTasks.

Thus, in accordance with at least one embodiment of the invention, it is recognized herein that the aforementioned hardware resources could be better utilized to service other pending ReduceTasks or MapTasks while idle. In addition, after all MapTasks finish and release occupied slots, the already launched ReduceTasks cannot utilize these available slots because they are monolithic and cannot be broken down any further. For a majority of jobs, an optimal configuration involves having all ReduceTasks start before the map phase is completely finished. Thus, the slots released by MapTasks, and the hardware resources associated with these slots, will often not be used at all after the MapTasks finish.

In accordance with at least one embodiment of the invention, arrangements as broadly contemplated herein leverage a new architecture of MapReduce to ultimately resolve, at the very least, the performance problems discussed above. A guiding principle involves the use of fine-grained tasks, e.g., slimmed ReduceTasks with smaller partitions, and to delicately and proactively schedule tasks in refined time scales through an efficient switching of task contexts.

In accordance with at least one embodiment of the invention, multiple fine-grained ReduceTasks are dynamically assembled in runtime to form a progressive queue, wherein tasks contained in this queue have already made some progress, either running or yielded). These multiple ReduceTasks run in the same JVM one at a time (e.g., in a rotation or order determined by the flow control algorithm), wherein one task passes control to the next in the same progressive queue according to a detect-and-yield mechanism. This mechanism thus automatically detects the best time points to trigger yielding, e.g., when the fetch threads of the ReduceTasks are underutilized. In order to avoid under- or overutilization of the fetch threads, ReduceTasks are gradually inserted into the progressive queue according to a flow control algorithm. If the resources are still underused, MapTasks can be further backfilled within the stream of ReduceTask runs. Toward this purpose, all fetch and merge threads (memory-to-disk and disk-to-disk) are extracted out of the ReduceTasks and are implemented as standalone services shared by ReduceTasks. Thus, ReduceTasks become slimmed in that they will only now contain fetched data and user-defined reduce functions.

In accordance with at least one embodiment of the invention, the fetch threads can ship the intermediate data from multiple ReduceTasks, one at a time, to the same JVM heap. The standalone merge threads allow the memory segments to be merged even when there are no running ReduceTasks (e.g., when backfilling MapTasks between ReduceTask executions in the same JVM). Since the fetched data segments of multiple ReduceTasks reside simultaneously in the same JVM heap, a dynamic arrangement as broadly contemplated herein introduces a segment manager to govern the memory usage. The segment manager determines which memory segments should be merged to files and when. This permits efficient task context switching entirely in memory and avoids unnecessary materialization that would needs to consume I/O and storage to write memory data to disk files.

By way of methods and arrangements as broadly contemplated herein, in accordance with at least one embodiment of the invention, performance for both single jobs and multi job workloads is significantly improved. Further, superior adaptivity is exhibited, yielding much better performance in a shared, dynamic cluster. This feature can be particularly important when multiple users submit jobs without being aware of the existence of others.

As recognized herein, conventional implementations present disadvantages by way of at least three key parameters that are difficult, and even impossible, to tune for optimal performance in a dynamic cluster. The first is the slowstart parameter that controls when ReduceTasks are launched depending on the percentage of the finished MapTasks. The second parameter is the number of ReduceTasks, equal to the number of static partitions of the key space, that determines the level of parallelism. The third parameter involves a ratio between running MapTasks and ReduceTasks. Specifically, before the number of finished MapTasks reaches the slowstart value, all slots can be used to run MapTasks. After all MapTasks complete, the whole slots can be used to run ReduceTasks if there are enough of them in number. In between, literally at each timepoint, a ratio can thus be calculated between the number of running MapTasks and ReduceTasks for each job, or what can be termed the map/reduce slot ratio for a job.

It is recognized herein that, with appropriate slowstart, the shuffling phase of the ReduceTask can overlap in time with its map phase and keep the fetch threads fully utilized. Precisely, it means that on one hand the reduce function can start soon after the map phase is done and on the other hand the ReduceTasks do not start too early so that the fetch threads are periodically blocked waiting for MapTasks to produce more data segments to fetch. With a good number of ReduceTasks, a running job can fully utilize the available slots to gain efficient parallelism. With a balanced map/reduce slot ratio, the map outputs are generated with a rate that matches with the speed by which the ReduceTasks fetch them. This greatly increases the chances to fetch the map output segments when they are still in the cached memory. Unfortunately, whenever the shared cluster has a job joining or finishing, the best tuned values for these parameters are no longer optimal for existing jobs. Even worse, they cannot be modified after a job starts its execution using these values.

Accordingly, in accordance with at least one embodiment of the invention, adaptive tuning for an optimal configuration can save tremendous efforts. A dynamic arrangement, as broadly contemplated herein, thus does not need to specify the slowstart, since it can automatically interleave multiple ReduceTasks and backfill MapTasks according to a detect-and-yield mechanism. Thus, the map/slot ratio remains not static but rather dynamic during a job execution, depending on runtime characteristics, e.g., intermediate data distributions, fetching capacities, and computing node speeds. Fetch threads are always fed with enough data segments; otherwise they yield the resources to other tasks with negligible overhead. Overhead can be dramatically minimized since a detection algorithm carefully chooses the best time points to yield, and the segment manager takes care of the data segments entirely in memory and avoids unnecessary materialization when switching task contexts.

In accordance with at least one embodiment of the invention, a dynamic arrangement as contemplated herein is generally insensitive to the number of ReduceTasks, and achieves uniformly good results over a wide range of such numbers. It still uses the static partitions of the key space for ReduceTasks, similarly to conventional implementations. However, it supports fine-grained ReduceTasks that can have much smaller partitions. Multiple ReduceTasks can thus be dynamically assembled together in the same progressive queue, and this permits great flexibility in a dynamic shared cluster.

In accordance with at least one embodiment of the invention, it is recognized that if MapReduce job characteristics can be learned, then a right amount of resources (CPU, memory, network) can be provisioned to a given job. This can admirably match the demand of the workload with the supply of computing resources. However, it can also be difficult to characterize ReduceTask dynamics in runtime accurately, since the fetch and merge threads as well as the execution of the reduce function exhibit distinct resource usage patterns. Thus, nothing beyond coarse-grained control is usually attainable. However, in accordance with a dynamic arrangement as broadly contemplated herein, more proactive and adaptive scheduling is permitted. Particularly, once computing resources are allocated, a focus can be brought on directly improving the utilization of the allocated resources through better scheduling.

It is recognized, in accordance with at least one embodiment of the invention, that in conventional MapReduce implementations the key space of the intermediate data (in key/value pairs) is statically partitioned into exclusive sets, wherein each partition corresponds to a ReduceTask. Inasmuch as the finest possible partition contains a single key, the ReduceTask input key/value pairs will end up with the same key and thus present no need for key-based sorting of intermediate data for shuffling. However, because this type of granularity is too small and the number of ReduceTasks is too large, such a solution is impractical and would impose significant overhead on the system. On the other extreme, the coarsest partition would be one that contains all of the key/value pairs, and thus present disadvantages in a lack of parallelism.

In accordance with at least one embodiment of the invention, it is recognized herein that a common practice is to choose fine-grained MapTasks so that each MapTask finishes quickly, and to choose coarse-grained ReduceTasks based on available slots. Ideally, this would permit all of the ReduceTasks to finish in one wave, via starting to fetch intermediate data at the same time and finishing the reduce function at the same time. However, this is difficult, or even impossible, in an actual production environment due to competition from multiple jobs.

Accordingly, in accordance with at least one embodiment of the invention, to obtain the best performance, users can configure an optimal partition, which ends up governing the number of ReduceTasks. To this end, the ReduceTask would be launched at an optimal moment according to the slowstart parameter. In addition, the map/reduce slot ratio would be tuned to control the number of map and reduce tasks running concurrently, constrained by the number of available slots.

Figure 2A:
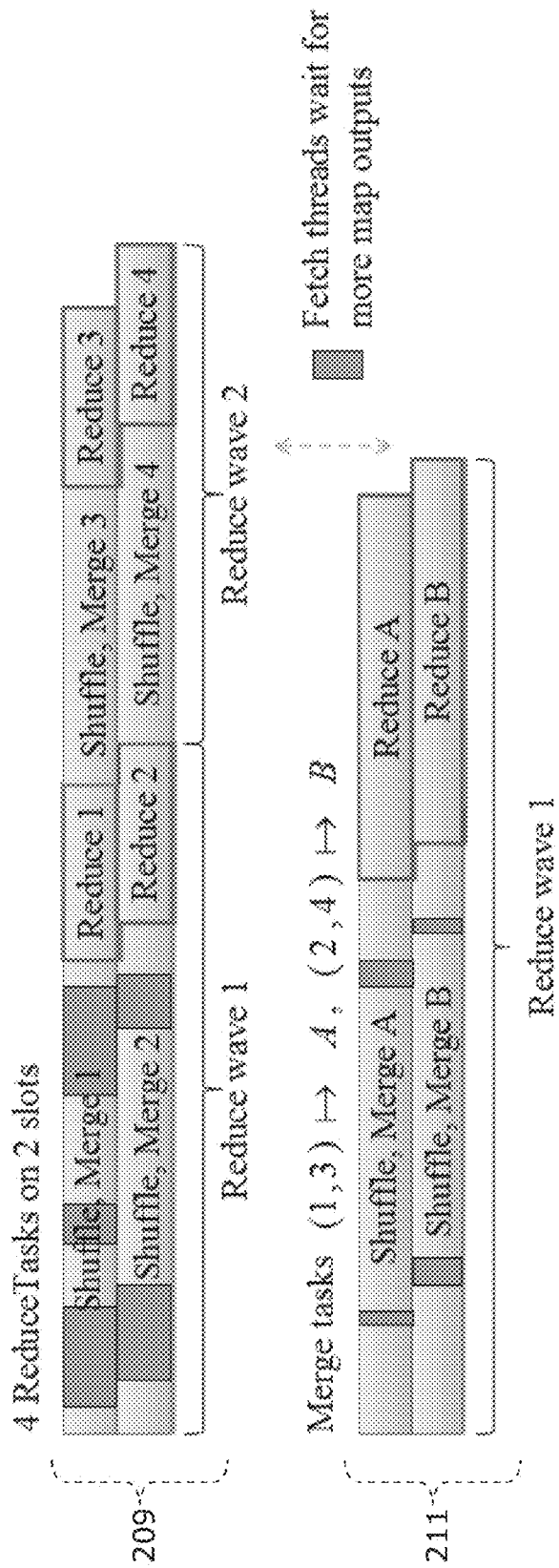
FIG. 2a sets forth a working example showing an impact of a number of ReduceTasks on performance.

As such, it can be appreciated, in accordance with at least one embodiment of the invention, that the number of ReduceTasks impacts performance, as illustrated in FIG. 2a. Here, a working example of introducing four ReduceTasks to two slots is shown (209), along with an example (211) of merging two different sets of tasks (1 and 3 into A, and 2 and 4 into B, respectively) therefrom. Accordingly, if the number of ReduceTasks is too large, the system may need to run multiple waves of ReduceTasks. Those that are not started in the first wave lose the opportunities to parallelize the shuffle and merge. One consequence is that these ReduceTasks cannot fetch map outputs directly from cached memory, resulting in longer execution times. This can be costly if the shuffle and merge are heavy. Additionally, with more ReduceTasks (or, equivalently, the number of partitions), each partition contains fewer keys and a smaller amount of data to fetch. Thus, the intermediate data fetched by the running ReduceTasks may not be generated quickly enough by the MapTasks. This can cause idle periods for the fetch threads. If the number of ReduceTasks is too small, they cannot fully utilize the available slots.

Figure 2B:
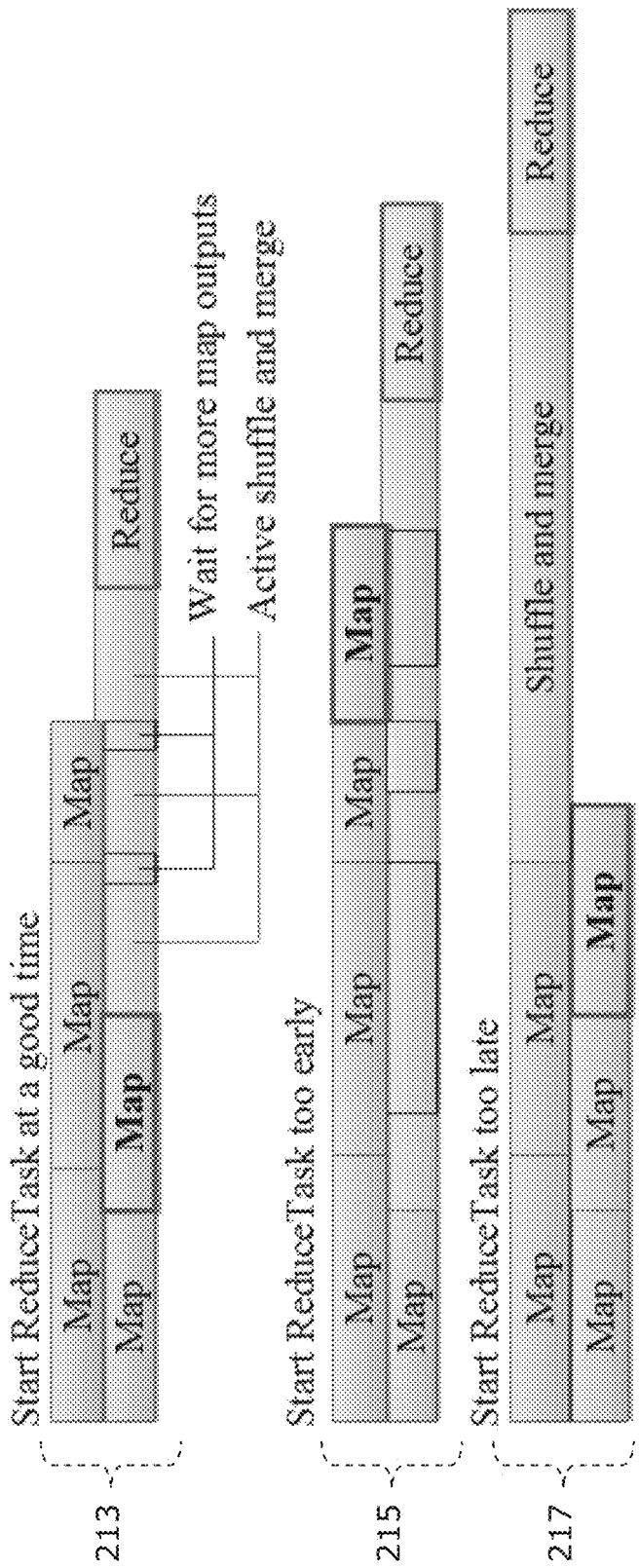
FIG. 2b sets forth a working example showing an impact of slowstart on performance.

In accordance with at least one embodiment of the invention, as can be appreciated from FIG. 2b, the slowstart value and the map/reduce slot ratio can greatly influence execution. Working examples are shown here of starting a ReduceTask at a good time (213), too early (215) or too late (217). If ReduceTasks start too early (215) or too many of them run concurrently, the MapTasks may not be processed at a fast enough rate, causing the ReduceTasks to have no data to fetch while occupying slots that could have been running MapTasks. This can make the map phase take much longer to finish. On the other hand, if the system starts ReduceTasks too late (217) or runs too few of them concurrently, the shuffle and merge for ReduceTasks may not be sufficiently amortized with the map phase. This can result in multiple waves of ReduceTasks and cache misses for fetching map outputs, causing the job to run longer. For the typical I/O intensive shuffle phase and CPU intensive map phase, to overlap these phases properly can expedite execution. Without this overlapping, if many ReduceTasks try to fetch map outputs from every node, it is possible to cause network or disk contentions on bottlenecks.

In accordance with at least one embodiment of the invention, it is thus recognized that it is very difficult, if not impossible, to optimally decide these values for a shared cluster in runtime. A primary problem is that, even their optimal values upon submission of a job are known, these values change as competing jobs join and leave. This is because a job may have been tuned for the full capacity of the cluster, but the capacity assigned to this job may be halved, for example, when the cluster is shared with a second job. Even worse, with existing MapReduce implementations, the tuning parameters are static and cannot be adjusted after a job is submitted.

In accordance with at least one embodiment of the invention, it is recognized herein that during the shuffle stage, a ReduceTask uses network I/O and disk I/O to fetch data from remote nodes or the local disk. It also uses CPU when it merges fetched data segments, which involves sort and decompression/compression if data compression is enabled. When there is nothing to fetch during shuffling, the ReduceTasks need to wait. Setting a larger slowstart number can shorten the wait time, but the job elapsed time becomes longer because of late fetching of intermediate data. So a dilemma is thus presented between setting a small slowstart for early fetch and decreasing wait times during shuffling. Thus, a need is apparent for providing a mechanism which automatically detects underutilization and easily passes control to a next candidate task to fully utilize computing resources.

In accordance with at least one embodiment of the invention, it is recognized that skewed tasks have been widely observed for typical MapReduce jobs. If some of the ReduceTasks need to process more intermediate data than the others, these tasks can take longer execution times and cause a long-tail effect. However, even if the intermediate data are partitioned evenly, this problem with a long-tail effect can still happen.

In accordance with at least one embodiment of the invention, it is further recognized that in a shared cluster, trailing ReduceTasks naturally occur. In a production environment with multiple jobs, a job may not get enough slots to finish its ReduceTasks in one wave. A user may configure the number of ReduceTasks under the assumption that there are enough reduce slots in the cluster. However, having to split these slots among several jobs will cause the job to have multiple reduce waves. When a new job arrives, the scheduler may decide to move some slots from an existing job to the new one. Because MapTasks are usually fine-grained, the scheduler can wait for some Map-Tasks of the existing job to finish, and then shift the slots to the new job. However, for coarse-grained ReduceTasks, the scheduler may have to restart or preempt some of the running ReduceTasks of the existing job. If using restarts, the partially finished workloads are completely wasted. If using preemptions, e.g., adopting the mechanisms in, the paused ReduceTask would need to resume on the same node to forestall a high cost of data migration. Both approaches can result in trailing tasks. Thus, it is recognized that if the ReduceTasks were fine-grained and it were easy to switch contexts across different tasks without losing any work, this problem can be greatly mitigated.

In accordance with at least one embodiment of the invention, the importance of a map/reduce slot ratio (as discussed hereinabove) and its impact can be recognized. Particularly, tuning this parameter and/or its components can help balance the number of running MapTasks and ReduceTasks to ensure that: the rate of MapTask completion is high enough to feed the ReduceTasks; and a good number of ReduceTasks run concurrently to properly overlap with the map phase so that they can directly fetch the map outputs from cached memory.

It is further recognized, in accordance with at least one embodiment of the invention, that it can be very difficult, and perhaps virtually impossible, to statically tweak these parameters in a shared dynamic cluster to achieve a balanced map/reduce slot ratio. To illustrate this, it can first be recognized that running concurrent jobs or adding/removing a single host to/from the cluster can completely change the dynamics of the job. For example, removing a single host, or splitting the map slots among several jobs can cause the MapTask completion rate to drop significantly and thereby cause excess idle shuffling times for ReduceTasks, with the result of an unbalanced slot ratio. In another problem scenario, even if it were possible to find the best map/reduce slot ratio before the map phase completes, the occupied slots cannot be optimized after all of the MapTasks finish. Here, the ReduceTasks are launched in the allocated reduce slots, whereby after all of the MapTasks are done and more slots are released, they cannot be used by the already launched ReduceTasks. This can cause underutilization. Thus, a prospective advantage is recognized here in being able to adaptively decide a good, and thus possibly time-varying, map/reduce slot ratio before the map phase completes. In addition, after all MapTasks finish, the already launched ReduceTasks advantageously should be able to fully utilize all of the available slots if possible.

In accordance with at least one embodiment of the invention, a dynamic arrangement as broadly contemplated herein includes three components that can advantageously work independently or in close collaboration. At the very least, these three components, individually or working in any combination, assist in resolving conventional shortcomings and problems such as those discussed hereinabove. These three different components are a flow control procedure for the progressive queue, a detect-and-yield mechanism, and a segment manager with standalone merge services. All of these components are illustrated in FIG. 3, and are discussed in more detail herebelow.

Figure 3:
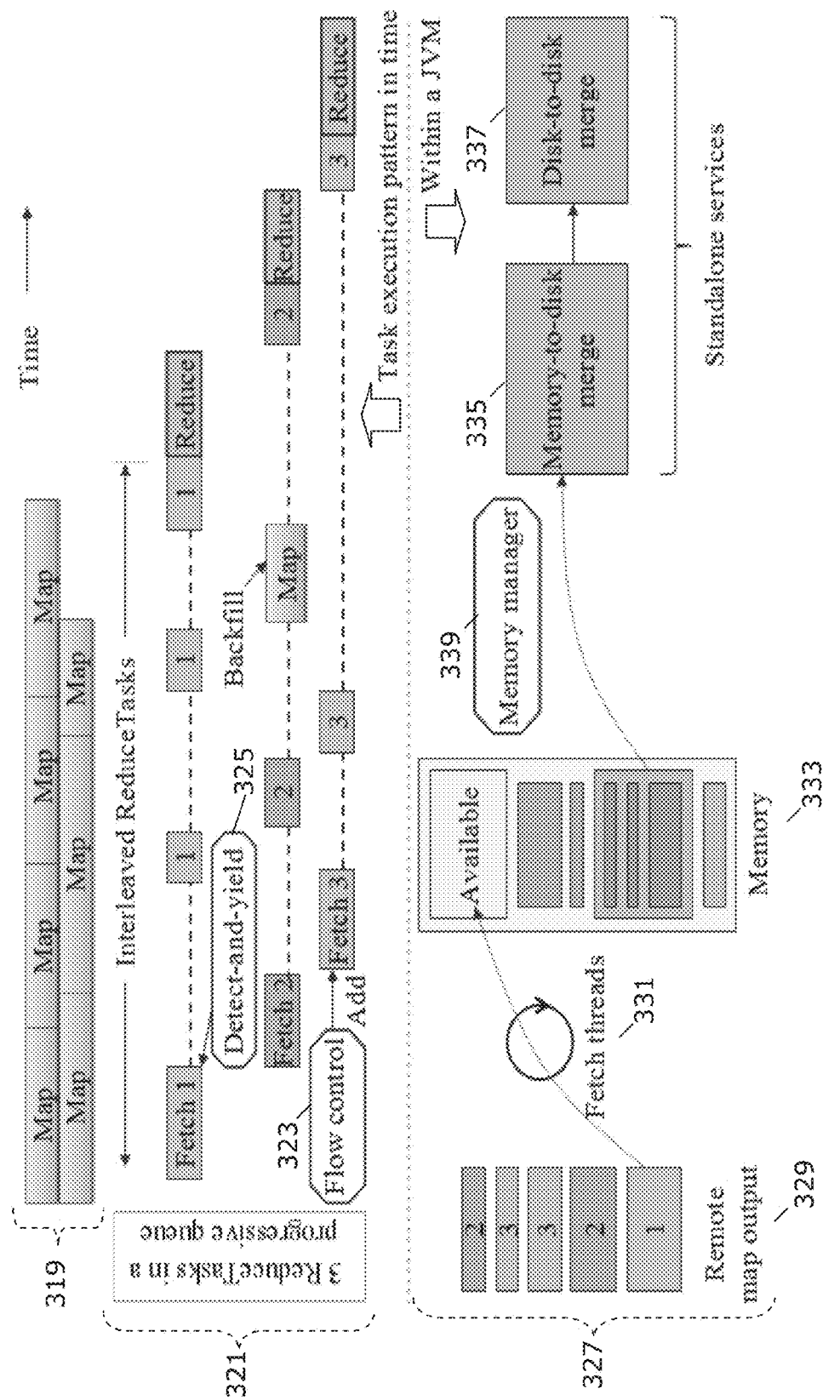
FIG. 3 illustrates a general implementation including a flow control procedure, a detect-and-yield mechanism and a segment manager.

In accordance with at least one embodiment of the invention, shown in the illustrative example of FIG. 3 is a set of task execution patterns (on a time-based scale progressing from left to right) including a set of MapTasks 319 and three interleaved ReduceTasks 321; the latter run in a progressive queue. A flow control procedure 323 and detect-and-yield mechanism 325, which may be provided separately or together and/or act independently or together, can act upon ReduceTasks 321 in a manner to be understood more fully below.

On the other hand, in accordance with at least one embodiment of the invention, indicated at 327 are tasks performed within a JVM, involving remote map output 329, fetch threads 331, memory 333, memory-to-disk merge 335 and disk-to-disk merge 337. These latter two may perform as standalone services. In a manner to be understood more fully below, a memory manager 339 acts upon memory 333 to assist in context switching and/or the provision of standalone services (e.g., 335 and 337). Memory manager 339 may be provided (and/or act) independently of a flow control procedure 323 and a detect-and-yield mechanism 325, or may be provided (and/or act) together with either or both of these.

In accordance with at least one embodiment of the invention, a good number of fine-grained ReduceTasks are assembled in runtime to form a progressive queue for each JVM. These ReduceTasks run in the same JVM one at a time; MapTasks can be backfilled within this stream of ReduceTask runs, if appropriate. The fetched data segments of multiple ReduceTasks of a progressive queue can reside in the same JVM heap simultaneously, thus requiring a segment manager to allocate the limited memory to multiple tasks.

As such, in accordance with at least one embodiment of the invention, a ReduceTask automatically detects the best time points to yield (e.g., if its fetch threads are underutilized) and passes the control to the next task in the same progressive queue according to a detect-and-yield mechanism. Thus, the monolithic ReduceTasks are adaptively decomposed into multiple refined phases. The timepoints used for yielding can depend on memory usage, fetch thread utilization, and merge thread characteristics. In contrast to the standard heart-beat mechanism of Hadoop, proactive scheduling decisions are made and driven by event; thus, whenever a task finishes or yields, a scheduling decision is immediately executed without delay.

In accordance with at least one embodiment of the invention, ReduceTasks are slimmed in the sense that their fetch and merge threads (memory-to-disk and disk-to-disk) have been extracted out as standalone shared services. They can serve data segments for multiple ReduceTasks on request, and allow a pipelined execution with the fetch threads of the ReduceTasks. The memory segments are organized by a segment manager, which determines what memory segments should be merged to disk files and when.

Broadly contemplated herein, in accordance with at least one embodiment of the invention, are methods and arrangements for undertaking interleave-independent tasks and backfill-dependent tasks, e.g., by way of a flow control procedure as indicated at 323 in FIG. 3. As such, it can be appreciated that MapReduce tasks represent a special case of "dependent tasks". Correlated tasks can present stage dependency, where "dependee" tasks' input data are typically shuffled or fetched from "depender" tasks' output data. For instance, in a MapReduce job that only has map and reduce stages, reduce tasks (dependees) depend on map tasks (dependers) for the intermediate data. Tasks within a stage are independent of each other, but share some common properties. In other words, in a MapReduce job, map (or reduce) tasks are independent of each other, but they can use the same executable and input/output format, and resource requirements. (It should be noted, as will be further appreciated herein, that a dependee set of tasks can itself end up representing a depender set of tasks relative to another dependee set of tasks.)

As such, broadly contemplated herein, in accordance with at least one embodiment of the invention, are arrangements to interleave-schedule these independent tasks that are in the same stage through yield-and-resume, and backfill-schedule depender tasks into one or more slots of dependee tasks. Particularly, in a given stage, a good number of tasks that belong to the stage are assembled into a progressive queue. The tasks in this progressive queue share the allocated computing resources by turns. The input of these tasks can depend on a different class of tasks, that can be referred to as depender tasks. A good number of depender tasks are thereby backfilled into the stream of task runs for the dependee tasks that run in a given progressive queue.

More particularly, it is recognized, in accordance with at least one embodiment of the invention, that multiple ReduceTasks of a progressive queue can interleave in the same JVM one after the other. Whenever every ReduceTask in the progressive queue has been launched and then yielded exactly once, it can be said that a round of service finishes and a new round of service begins. In order to improve resource utilization, the number of ReduceTasks in this progressive queue can to be determined adaptively in runtime, which depends on the amount of input data of the ReduceTasks, the execution time of the backfilled MapTasks, and the fetching speed of the hosting node. This then provides a flow control mechanism tailored for MapReduce, thereby determining: the task service order in the progressive queue; when to insert new ReduceTasks; and when (and to what numerical degree) to backfill MapTasks.

Figure 4:
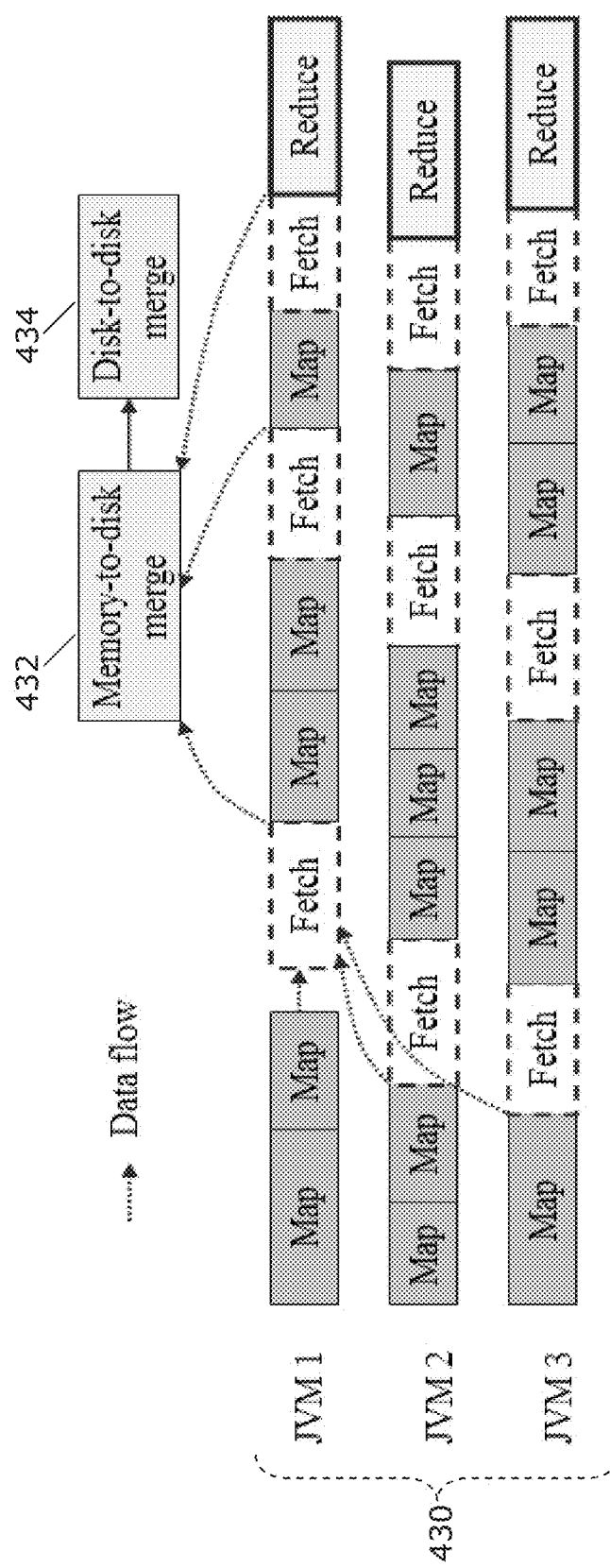
FIG. 4 illustrates an example of a data flow and task execution pattern.
Figure 6:
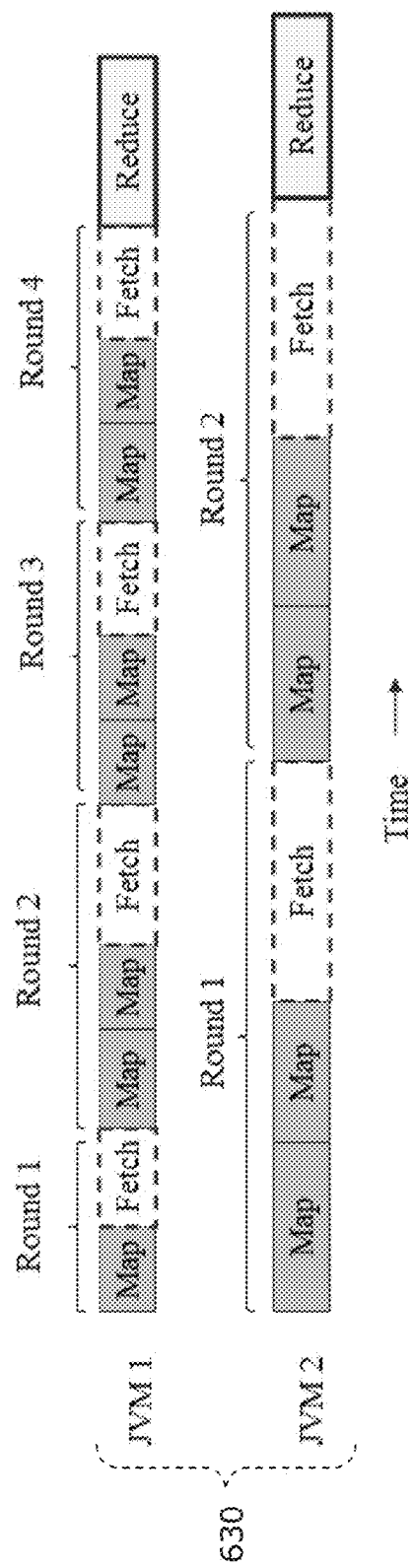
FIG. 6 illustrates another example of a data flow and task execution pattern.

In accordance with at least one embodiment of the invention, a data flow and task execution pattern on three service instances is shown in FIG. 4, with each pattern running in one of a number of JVMs 430 (three are shown here, individually labeled JVM 1-3). As shown, MapTasks and fetch threads of the ReduceTasks can be alternately served in each JVM. It can be more efficient to fetch the map outputs directly from cached memory. On the other hand, the aforementioned flow control serves to ensure that each fetch period shuffles enough data segments, and that the total size of the intermediate data that can be fetched by the ReduceTasks in a progressive queue does not overwhelm the fetch threads.

In accordance with at least one embodiment of the invention, since every ReduceTask typically needs to fetch one data segment from each of the map outputs, a good service order for executing ReduceTasks (assuming there are more than one thereof), as shown, can be applied in a progressive queue in each round of service. When a new round of service starts, all of the ReduceTasks are sorted in a progressive queue according to the number of already fetched map outputs for each, in ascending order. This provides a given task with task better opportunities to fetch more data segments when the segments are still in cached memory.

In accordance with at least one embodiment of the invention, when reaching the end of the progressive queue, a new ReduceTask (if any exists) is inserted at the end of the progressive queue, while a given number of MapTasks are consecutively backfilled before returning to the beginning of the progressive queue; here, the backfilled MapTasks are counted in a new round of service.

In accordance with at least one embodiment of the invention, an adaptive algorithm is employed to determine how many MapTasks to backfill. At the end of each round of service, a check is made as to whether at least one ReduceTask has ever filled up the memory before yielding. If not, this provides an indication that more MapTasks should be backfilled for this progressive queue. Ideally, in each of the fetch periods, the fetch threads expect to fetch enough intermediate data so that the total size (e.g., expressed in bytes) of segments staying in memory reaches a threshold (e.g., this can be configured by mapred.job.shuffle.merge.percent for Hadoop). This event triggers the memory-to-disk merge 432. After this merge ends, it is potentially a good time point to yield the running ReduceTask since the merge service has cleaned up the JVM heap by merging the memory segments into a disk file. Disk-to-disk merge 434 is also possible here, where files within a disk are merged together; events that may trigger such a merge are discussed in more detail further below.

It can be appreciated, in accordance with at least one embodiment of the invention, that if not enough MapTasks are backfilled, then segments may not fill up the memory space, causing the interleaved ReduceTasks to yield too frequently. Accordingly, FIG. 5 sets forth an algorithm 550 that serves to select the next ReduceTask to run from a progressive queue whenever a ReduceTask yields or finishes. This algorithm can backfill a different number of Map-Tasks in a service round. In addition, the number of service rounds for each progressive queue over the whole execution cycle can also be different. This is especially beneficial if the MapTasks are skewed, the input data to ReduceTasks are unbalanced, or the cluster has heterogeneous computing nodes.

In accordance with at least one embodiment of the invention, the length of each service round varies case by case. Thus, automatic load balancing can be undertaken according to MapTask skewness, ReduceTask input distribution, and processing speeds of the compute nodes; this can be appreciated by the illustrative example shown in FIG. 6. For example, out of JVMs 630, if JVM 1 runs on a more powerful node with faster CPU and network speed, or the MapTask or ReduceTask in question has a smaller input size, then each round of service takes a shorter time. This results in a higher turn-over rate, and thus JVM 1 runs more backfilled MapTasks than JVM 2 for the sake of better load balance. Apart from balanced work load, it has an additional benefit that the already launched ReduceTasks will not always fetch intermediate data simultaneously. This can reduce congestions at network and disk I/O bottlenecks.

In accordance with at least one embodiment of the invention, since multiple ReduceTasks can be interleaved and MapTasks backfilled, the map/reduce slot ratio is not static anymore. It can change from time to time, depending on job characteristics, hardware speeds and input data size distribution. Therefore, the map/reduce slot ratio cannot be directly configured since, by default, ReduceTasks are permitted to run on all slots. However, in a multi job scenario, it can be appreciated that it is not always advantageous to scatter the ReduceTasks across all slots, since it can impact the execution of other jobs. The impact occurs because a job will store intermediate data on slots that run ReduceTasks, and ultimately these data need to be processed on the residing slots. On the other hand, slots that purely involve running MapTasks can easily be given up to other jobs after a currently running MapTask completes. Accordingly, as broadly contemplated herein, instead of the map/reduce slot ratio being controlled, a maximum percentage of slots that can be used to launch progressive queues for a job can be configured. If not specified, this percentage can be set to 100%, in that only when a slot runs a progressive queue can ReduceTasks execute on the corresponding slot.

Broadly contemplated herein, in accordance with at least one embodiment of the invention, are methods and arrangements for detecting optimal time points to voluntarily yield resources for context switching in distributed data processing, e.g., by way of a detect-and-yield mechanism as indicated at 325 in FIG. 3. This involves improving the progress of pipelining between depender (map) and dependee (reduce) tasks. Generally, dependee tasks need to yield not only CPU but also memory or other resources to depender tasks, because tasks in different stages may have different resource requirements. They voluntarily yield after detecting certain events that indicate resource underutilization. Since multiple dimensions of computing resources are involved, a holistic approach is broadly contemplated herein to consider all of them for an efficient detection algorithm.

In accordance with at least one embodiment of the invention, a working thread of a given task divides its work into multiple rounds. In each round, a check is made as to whether the allocated workload is under-utilized or not. The status of other allocated resources is also checked, including memory and network, along with how much memory has been used for storing data of the working thread. A check is also made as to whether network bandwidth is fully utilized, e.g., through checking the network delay for fetching a certain amount of data. Based on all of the collected information, the thread decides whether to yield or not. When yielding, the task keeps the context and fetched data in memory for record. All allocated resources are yielded, and control is passed to a next selected task. When a task resumes, it gets the stored task context and fetched data, and the next task is met without wasting work.

In accordance with at least one embodiment of the invention, it can be appreciated that a ReduceTask has multiple fetch threads, while a fetch thread divides the whole work into multiple rounds. In each round, a thread creates a TCP/IP connection to one of the compute nodes to fetch data. In one connection, it fetches no more than a certain number of data segments, while after that it closes the socket and connects to a different computing node to avoid congestion on a compute node.

Generally, it can thus be appreciated, in accordance with at least one embodiment of the invention, that the fetch threads could be underutilized or even idle. When a ReduceTask has already fetched the outputs from all of the already finished MapTasks, instead of waiting for more map outputs to be generated, it may be better to let the current ReduceTask yield and pass control to the next task; this can fully utilize the computing resources, e.g., CPU, network and disk I/O. However, to yield only when all fetch threads are idle is still far less than optimal. For example, in the course of a poorly scheduled execution, it is possible that exactly one fetch thread is active, if (for instance) only a single new map output is constantly observed for each fetch. Thus, an efficient detection algorithm could help in identifying the best yielding time points.

Accordingly, in accordance with at least one embodiment of the invention, such a detection algorithm takes into consideration the following. Let $N_{thread}$ represent the number of fetch threads, and $N_{idle}$ the number of idle threads. In each round of TCP/IP connection, a fetch thread only fetches up to a maximum number of segments (denoted by max_num_fetch). A fetch thread can be regarded as underused if it can only fetch less than max_num_fetch segments in a connection.

In accordance with at least one embodiment of the invention, if all fetch threads are idle (i.e., $N_{idle}=N_{thread}$), the ReduceTask should yield immediately since it has no work to do. If $N_{idle}<N_{thread}$, a computation is made as to how much memory is still left in the JVM heap that has been reserved to hold memory segments for the fetch threads. Should the memory segments fill up the allocated memory space (denoted by memory_full=Y), a check is simply made as to how many fetch threads are underused. If this number exceeds a threshold (denoted by underused_num, by default 3), then the ReduceTask first merges all the memory segments into disk and then yields. (A default of 3 is noted here merely by way of illustrative example; for instance, such a default can be employed when the default number of total threads, or $N_{thread}$, is 5.)

In accordance with at least one embodiment of the invention, if the memory is not full (memory_full=N), a dilemma presents itself on whether to yield or not. Particularly, yielding may be warranted as $N_{idle}<N_{thread}$ (i.e., some fetch threads are idle), which indicates that the already finished MapTasks do not have enough data for the fetch threads to work on. On the other hand, continued fetching may be warranted as there still will be available data segments to keep part of the threads busy. As a compromise, tougher conditions are chosen to trigger the ReduceTask to yield. In this connection, the following are checked: the idle ratio, defined by $N_{idle}=N_{thread}$; and the underused ratio, equal to the maximum of the number of segments fetched by the active threads in their most recent connections divided by max_num_fetch. If the idle ratio exceeds a threshold (configured by idle ratio threshold, e.g., 0.4), and the underused ratio is below a threshold (configured by underused ratio threshold, e.g., 0.6), the ReduceTask is permitted to yield. The aforementioned ratios can be chosen at essentially any suitable level, but preferably are less than 1.0.

In accordance with at least one embodiment of the invention, if too many ReduceTasks run simultaneously and cause congestion (e.g., for disk I/O), it is preferred that some of the running ReduceTasks yield so that MapTasks are backfilled therein. For each round of connection, the time taken and the amount of bytes fetched are measured As an example, it could take about 100-320 milliseconds to fetch one segment (e.g., approximately 530 MB). When having already fetched more than a certain number of rounds, the average value of the ratio between the fetch time and fetched data size can be computed. Then, for subsequent fetches, if one takes much longer than the average (e.g., 10 times longer), that indicates that too many fetch threads are working concurrently to cause congestions (denoted by congestion=Y). A reasonable control is then to yield some of the ReduceTasks; here, the ReduceTask is permitted to yield if, as well, its memory segments can fill in at least half of the allocated memory space.

In accordance with at least one embodiment of the invention, by using the aforementioned detection algorithm, it is possible that when some of the fetch threads are underused or even idle, the ReduceTask can continue to fetch until the memory is full (or almost full) if there are still data segments to fetch. This owes to the consideration that more memory segments can be merged into a bigger disk file. Larger spills can thus greatly decrease the disk seek times. In accordance with at least one embodiment of the invention, once a triggering condition is detected, the ReduceTask stops using fetch threads and returns control to the scheduler. Before yielding, it keeps a record on the indexes of the already fetched map outputs and the paths of the spilled files in the local file system.

Broadly contemplated herein, in accordance with at least one embodiment of the invention, are methods and arrangements for managing data segments in memory for context switching and provide standalone merge services for MapReduce, e.g., by way of a memory manager as indicated at 339 in FIG. 3. Among other things, this involves management of in-memory and on-disk data segments, especially for dependee (reduce) tasks that use memory and disk to hold the intermediate data. Multiple tasks are thereby to run in an interleaved manner on a slot with negligible overhead and efficient pipelining.

In accordance with at least one embodiment of the invention, since at a given stage (e.g., reduce) independent tasks share common executable binaries, the latter are extracted out as standalone services. Accordingly, merge threads (e.g., memory-to-disk merge and disk-to-disk merge) can be extracted as two standalone services that can service any ReduceTask that run in the service instance. Additionally, since in big data systems the memory can contain many data segments, a segment manager can be implemented to manage these segments. Particularly, a determination is made as to which data segments should be moved from memory to disk, and when. When switching task contexts, the task that is going to yield simply passes the control of the memory data segments to the segment manager and then yields. This obviates unnecessary data storage in disk.

By way of additional detail, in accordance with at least one embodiment of the invention, an importance of efficient context switching is recognized. Since the memory can possibly hold large volumes of data segments, simply using a paging technique to swap them out to disk can incur huge overhead. Accordingly, a segment manager as broadly contemplated herein avoids unnecessary materialization. When a ReduceTask yields, its memory segments will be controlled by the segment manager. The segment manager can then optimally decide whether to keep the data segments in memory or move them to disk. In fact, the memory segments of multiple ReduceTasks can reside in the same JVM heap simultaneously. When the memory is full, the manager can decide how many segments from which ReduceTask will be merged to disk.

In accordance with at least one embodiment of the invention, when a MapTask is backfilled or the ReduceTasks from a different job enter a JVM, the fetched segments that are still stored in memory may need to be merged to disk. This is because the user-defined map function of the MapTask can take lots of memory (e.g., for creating objects and buffers), and the ReduceTasks from a different job may change the compression codec used by the merge services. Therefore, even when no ReduceTask is running, it can be still necessary to merge memory segments. To this end, all the merge threads that can work in the absence of ReduceTasks are extracted out as standalone services.

In accordance with at least one embodiment of the invention, it can be appreciated that multiple ReduceTasks run in the same JVM and, at any time, only one ReduceTask is active with fetch threads. The other ReduceTasks are inactive and only have data segments stored in this JVM. Thus, as broadly contemplated herein, there is created in each JVM: a segment manager (using a singular design pattern), a memory-to-disk merge thread, and a disk-to-disk merge thread. Since the merge threads may need to use a compression codec specified by the user program, the codec is updated whenever a task from a new job enters the JVM. When a ReduceTask (either a new task or a yielded one) becomes active, the segment manager and the two merge threads are bound to the active ReduceTask; these are then unbound from the ReduceTask when the latter yields. During binding, a new file folder path is created to store file spills for the active ReduceTask if it has never yielded before. In addition, the compression codec and the decompressor are updated as needed.

In accordance with at least one embodiment of the invention, a segment manager stores memory segments for each ReduceTask that runs in the corresponding JVM. In accordance with algorithm 775 in FIG. 7, when the memory is full, a ReduceTask is selected and all of its memory segments are merged to a single file which is then passed to the disk-to-disk merge thread. In the meantime, the fetch threads can work via pipelining with the merge threads. Fetch threads of a running ReduceTask turn to a wait status when the memory is full, and continue fetching whenever the memory-to-disk merge releases enough memory space.

In accordance with at least one embodiment of the invention, for memory-to-disk merge, the selection of the task in algorithm 775 prefers an inactive ReduceTask that has enough number of bytes in memory. Only when the size of the memory segments of every inactive ReduceTask is less than a threshold, shall the active ReduceTask be selected. The purpose here is to generate large spilled files for the active ReduceTask, since it still is actively fetching data segments into the JVM heap while the inactive ReduceTasks do not use fetch threads.

In accordance with at least one embodiment of the invention, disk-to-disk merge can be triggered in different manners. By way of example, when the number of spills of a ReduceTask exceeds a threshold (io.sort.factor), some disk files can be triggered to merge into a single one; such an approach is adopted in conventional MapReduce implementations. Since the memory-to-disk merge is only triggered when the memory is full, each of the spilled files is large enough to contain at least enough bytes that can fill up the allocated memory. However, as broadly contemplated herein, even though the detect-and-yield algorithm and the segment manager prefer large spills, small files can still be generated when backfilling a MapTask or launching a ReduceTask from a different job. Thus, a different algorithm is used to avoid generating small files.

In accordance with at least one embodiment of the invention, other events can also trigger disk-to-disk merge. For instance, each ReduceTask maintains a list of spilled files, and these files are sorted according to their sizes in ascending order. Whenever the memory-to-disk merge thread passes a file to the disk-to-disk merge thread, it compares this file size and the size of the memory reserved to hold segments. If the former is less than a certain ratio (e.g., 0.5) of the latter, this new file and the smallest one in the linked list are immediately merged. (This ratio can be chosen to be at any suitable level; preferably it is less than 1.0, and it can be noted that the smaller the ration, the more easily a merge is triggered,)

By way of general recapitulation, in accordance with at least one embodiment of the invention, it is recognized that in conventional MapReduce, MapTasks tend to be fine-grained, while ReduceTasks tend to be coarse-grained. Also, ReduceTasks tightly bundle functional phases together. It is recognized that, ideally all ReduceTasks should finish in one wave so that the shuffle phases are pipelined/overlapped with the map phase. However, it is fundamentally not easy to decide how many coarse-grained ReduceTasks to set, nor is it easy to guarantee that they can start and finish in one wave. This problem gets worse when a single job has a task long-tail effect caused by data skew or heterogeneous computing nodes, and when multiple jobs compete for slots that may appear randomly as jobs join and leave.

As such, in accordance with at least one embodiment of the invention, a dynamic arrangement as broadly contemplated herein supports fine-grained ReduceTasks with decoupled functional phases. It delicately and proactively schedules tasks through efficient context switching, and balances workload through a tailored flow control mechanism. It not only solves the resource underutilization problem but also mitigates the long-tail effect. With ReduceTask interleaving and MapTask backfilling, users can freely set fine-grained ReduceTasks. Arrangements as broadly contemplated herein pipeline all the shuffle phases with the map phases, and completely remove shuffle waiting times. Owing to high flexibility and low overhead to switch task contexts, ReduceTasks can even run on all slots without blocking other tasks.

Figure 8:
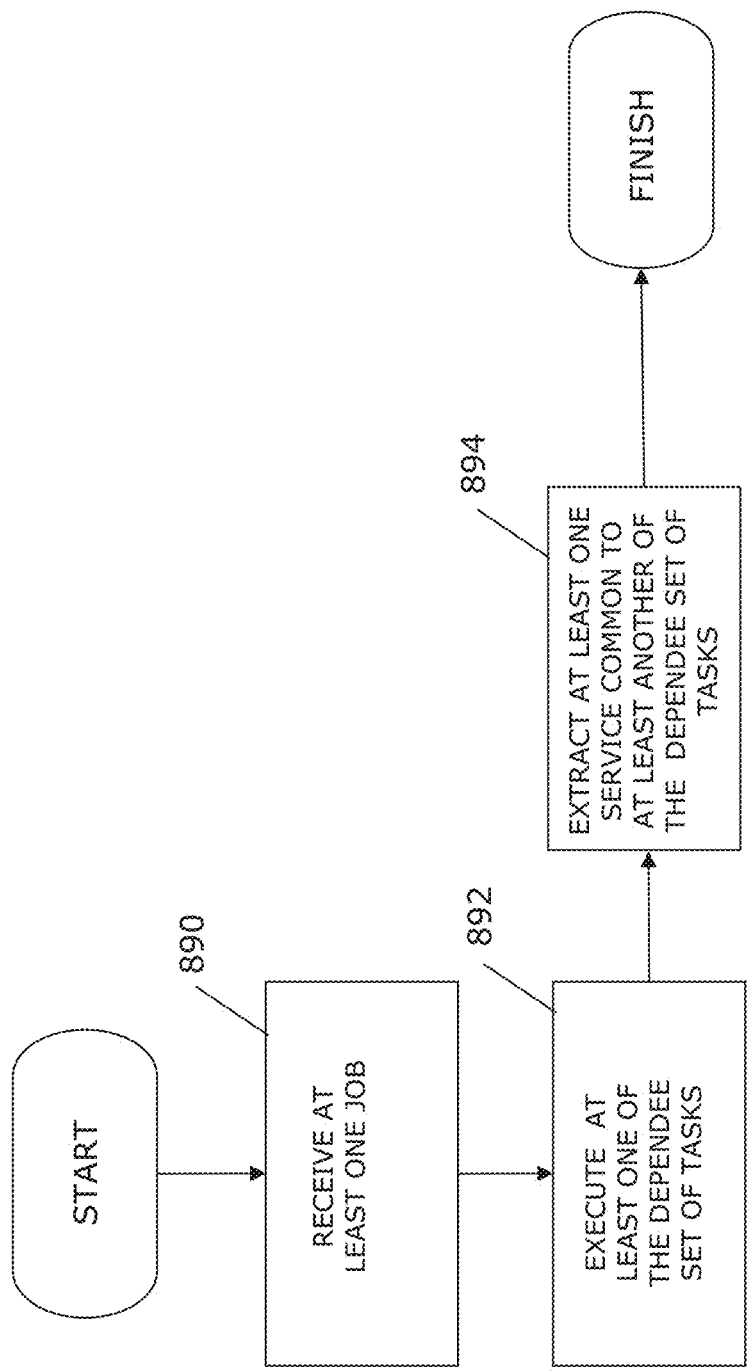
FIG. 8 sets forth a process more generally for assembling tasks in a progressive queue.

FIG. 8 sets forth a process more generally for managing data segments, in accordance with at least one embodiment of the invention. It should be appreciated that a process such as that broadly illustrated in FIG. 8 can be carried out on essentially any suitable computer system or set of computer systems, which may, by way of an illustrative and non-restrictive example, include a system such as that indicated at 12' in FIG. 9. In accordance with an example embodiment, most if not all of the process steps discussed with respect to FIG. 8 can be performed by way of a processing unit or units and system memory such as those indicated, respectively, at 16' and 28' in FIG. 9.

As shown in FIG. 8, in accordance with at least one embodiment of the invention, at least one job is received (890), each job comprising a dependee set of tasks and a depender set of at least one task, and the at least one of the dependee set of tasks is executed (892). There is extracted, from the at least one of the dependee set of tasks, at least one service common to at least another of the dependee set of tasks (894).

Figure 9:
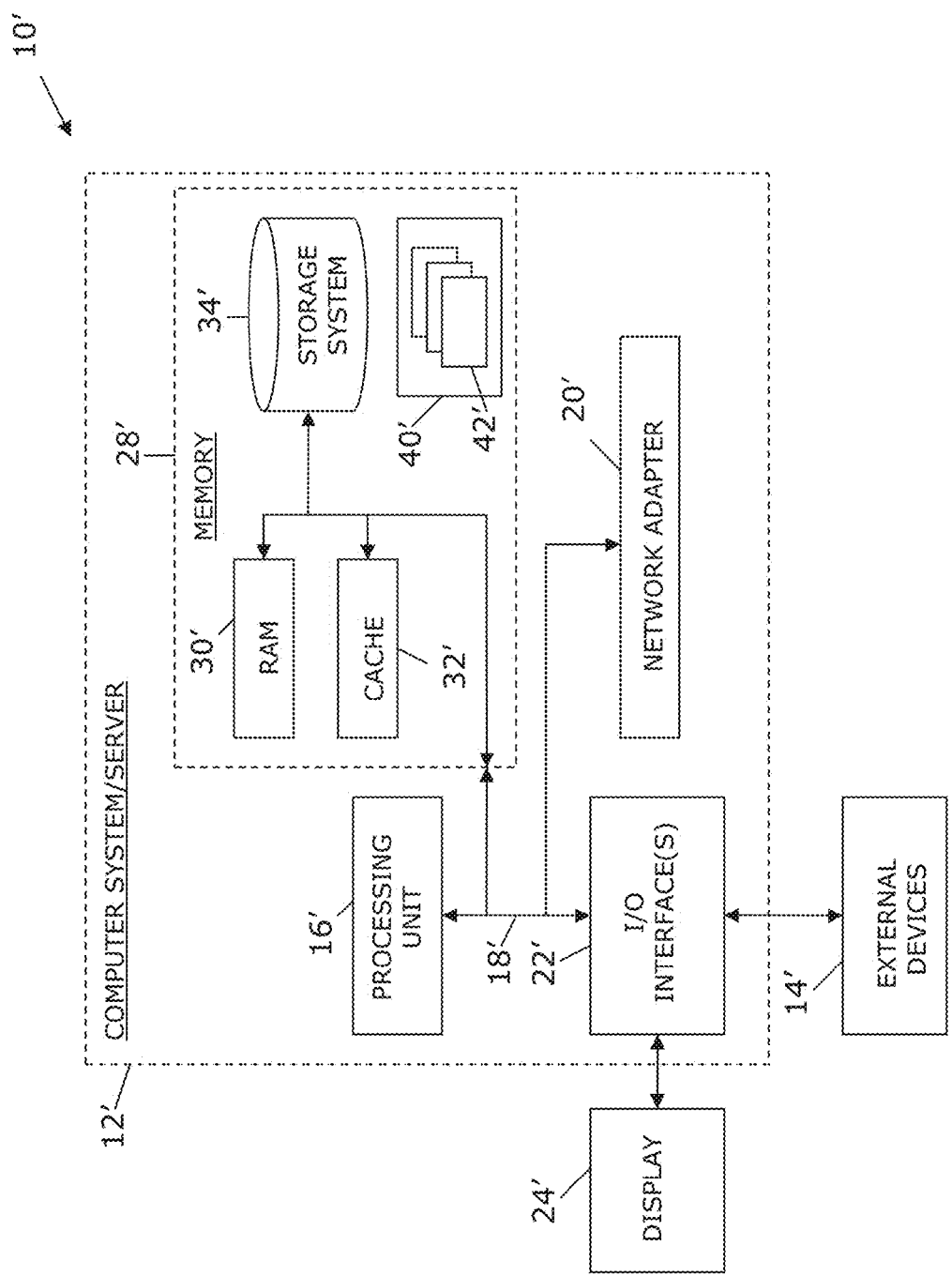
FIG. 9 illustrates a computer system.

Referring now to FIG. 9, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
utilizing at least one processor to execute computer code configured to perform the steps of:
receiving at least one job, each job comprising a dependee set of tasks and a depender set of at least one task;
wherein the dependee set of tasks comprises a reduce phase, and the depender set of at least one task comprises a map phase;
executing at least one of the dependee set of tasks, wherein the executing comprises assembling the dependee set of tasks in a progressive queue, wherein the tasks in the progressive queue comprise partially completed tasks, and wherein Vie executing comprises:
extracting from the at least one of the dependee set of tasks at least one service common to at least another of the dependee set of tasks, wherein said extracting comprises extracting fetch threads and merge threads from the dependee set of tasks;
implementing the fetch threads and the merge threads as standalone services;
providing a memory segment manager, wherein the memory segment manager merges the partially completed tasks without the fetch threads and the merge threads and identifies uncerutilized task execution resources; and
inserting, based upon the identification of an underutilized task execution resource, at least one of: additional partially completed tasks and the depender set of at least one task, into the progressive queue until the underutilized task execution resource is fully utilized, wherein one task yields to another task in the progressive queue when the fetch thread are underutilized.

2. The method according to claim 1, wherein the fetch threads comprises a fetch service which fetches data from a remote node or a local disk and wherein the merge threads comprises at least one of: a memory-to-disk merge service and a disk-to-disk merge service.

3. The method according to claim 2, comprising providing a memory segment manager operative with the at least one of: a fetch service, a memory-to-disk merge service, and a disk-to-disk merge service.

4. The method according to claim 1, wherein:
the at least one merge thread comprises a memory-to-disk merge service; and
the memory segment manager manages movement of memory data segments from memory to disk.

5. The method according to claim 1, wherein the memory segment manager manages a transition control of memory data segments upon a switch in task contexts.

6. The method according to claim 1, wherein the at least one fetch or merge thread comprises at least one fetch thread.

7. The method according to claim 1, wherein the at least one fetch or merge thread comprises at least one merge thread.

8. An apparatus comprising:
at least one processor; and
a computer readable storage medium having computer readable program code embodies therewith and executable by the at least one processor, the computer readable program code comprising:
computer readable program code configured to receive at least one job, each job comprising a dependee set of tasks and a depender set of at least one task;
wherein the dependee set of tasks comprises a reduce phase, and the depender set of at least one task comprises a map phase;
computer readable program code configured to execute at least one of the dependee set of tasks, wherein the executing comprises assembling the dependee set of tasks in a progressive queue, wherein the tasks in the progressive queue comprise partially completed tasks, and wherein the executing comprises:
computer readable program code configured to extract from the at least one of the dependee set of tasks, wherein the extracting comprises extracting fetch threads and merge threads from the dependee set of tasks;
computer readable program code configured to implement the fetch threads and the merge threads as standalone services;
computer readable program code configured to provide a memory segment manager, wherein the memory segment manager merges the partially completed tasks without the fetch threads and the merge threads and identifies underutilized task execution resources; and
inserting, based upon the identification of an underutilized task execution resource, at least one of: additional partially completed tasks and the depender set of at least one task, into the progressive queue until the underutilized task execution resource is fully utilized, wherein one task yields to another task in the progressive queue when the fetch thread is underutilized.

9. A computer program product comprising:
a computer readable storage medium having computer readable program code embodied therewith, the computer readable program code comprising:

computer readable program code configured to receive at least one job, each job comprising a dependee set of tasks and a depender set of at least one task;

wherein the dependee set of tasks comprises a reduce phase, and the depender set of at least one task comprises a map phase;

computer readable program code configured to execute at least one of the dependee set of tasks, wherein the executing comprises assembling the dependee set of tasks in a progressive queue, wherein the tasks in the progressive queue comprise partially completed tasks, and wherein the executing comprises:

computer readable program code configured to extract from the at least one of the dependee set of tasks, wherein the extracting comprises extracting fetch threads and merge threads from the dependee set of tasks;

computer readable program code configured to implement the fetch threads and the merge threads as standalone services;

computer readable program code configured to provide a memory segment manager, wherein the memory segment manager merges the partially completed tasks without the fetch threads and the merge threads and identifies underutilized task execution resources; and inserting, based upon the identification of an underutilized task execution resource, at least one of: additional partially completed tasks and the depender set of at least one task, into the progressive queue until the underutilized task execution resource is fully utilized, wherein one task yields to another task in the progressive-queue when the fetch thread is underutilized.

10. The computer program product according to claim 9, wherein the fetch threads comprises a fetch service which fetches data from a remote node or a local disk and wherein the merge threads comprises at least one of: a memory-to-disk merge service and a disk-to-disk merge service.

11. The computer program product according to claim 10, wherein computer readable program code is configured to provide a memory segment manager operative with the at least one of: a fetch service, a memory-to-disk merge service, and a disk-to-disk merge service.

12. The computer program product according to claim 11, wherein:

the at least one merge thread comprises a memory-to-disk merge service; and the memory segment manager manages movement of memory data segments from memory to disk.

13. The computer program product according to claim 11, wherein the memory segment manager Manages a transition control of memory data segments upon a switch in task contexts.

14. The computer program product according to claim 9, the at least one fetch or merge thread comprises at least one merge thread.

15. The method according to claim 1, wherein the at least one fetch or merge thread comprises at least one of: a memory-to-disk merge service, and a disk-to-disk merge service.

16. The method according to claim 1, wherein the at least one fetch or merge thread is operable as a standalone service in the absence of said executing of the at least one of the dependee set of tasks, wherein the operable standalone service is the at least one fetch or merge thread controlled by the memory segment operative and can be shared with the tasks of at least one other task of the dependee set of tasks.

17. The method according to claim 1, wherein the memory segment operative determines a dynamic merging sequence of the at least one fetch or merge thread in an interleaved rotation.

* * * * *